United States Patent [19]

Wörner et al.

[11] Patent Number: 4,669,261
[45] Date of Patent: Jun. 2, 1987

[54] EXHAUST GAS TREATMENT DEVICE FOR INTERNAL COMBUSTION ENGINES

[75] Inventors: Siegfried Wörner, Esslingen; Walter Öttle, Faurndau, both of Fed. Rep. of Germany

[73] Assignee: J. Eberspächer, Del.X

[21] Appl. No.: 815,758

[22] Filed: Jan. 2, 1986

Related U.S. Application Data

[63] Continuation of Ser. No. 475,093, Mar. 14, 1983, abandoned.

[30] Foreign Application Priority Data

May 8, 1982 [DE] Fed. Rep. of Germany ....... 3217357

[51] Int. Cl.[4] ........................... F01N 3/02; F01N 3/28
[52] U.S. Cl. ........................................ 60/297; 60/299; 60/311; 422/171; 422/178; 422/180
[58] Field of Search .................. 60/297, 311, 299; 422/171, 178, 180

[56] References Cited

U.S. PATENT DOCUMENTS 4,195,063  3/1980  Iwaoka ................................ 422/180
4,363,644  12/1982  Sato ................................... 422/180
4,441,899  4/1984  Takagi .......................... 55/DIG. 30

FOREIGN PATENT DOCUMENTS 148607  11/1981  Japan ................................. 60/311

Primary Examiner—Douglas Hart
Attorney, Agent, or Firm—McGlew and Tuttle

[57] ABSTRACT

An exhaust gas treatment device adapted to be connected into an exhaust line of an internal combustion engine comprises a porous body made of heat resistant material and having a plurality of conduits extending axially therethrough having an inlet end and an opposite outlet. The construction includes a closure member closing the inlet ends of at least some of the conduits. An additional closing member closes the outlet ends of at least some of the other of the conduits. A catalyst mesh material is positioned in at least some of the conduits which have open inlet ends. Exhaust gases flow into the inlet ends which are open. In some if not all of the cases, the opposite ends of the open inlet ends that is the outlet ends are closed so that the gases must flow through the porous walls of the porous body and move into contact with the catalyst mesh material of the others of the conduits and flow out the ends of those conduits which are open. The member which provides the closures for the individual conduits at the respective inlet and outlet ends may comprise simply plug elements or fixed or rotatable end members at each end which as closure plate parts arranged in substantially a checkerboard pattern so that alternately adjacent squares of the pattern are opened.

8 Claims, 3 Drawing Figures

EXHAUST GAS TREATMENT DEVICE FOR INTERNAL COMBUSTION ENGINES

This application is a continuation of application Ser. No. 475,093, filed Mar. 14, 1983, now abandoned.

FIELD AND BACKGROUND OF THE INVENTION

The invention relates in general to exhaust gas treatment devices and in particular to a new and useful device for reducing the soot content in exhaust gases of combustion engines, comprising a ceramic body with lengthwise channels, which is mounted in an exhaust conduit as a means for separating or burning soot.

It is known that due to incomplete combustion, exhaust gases of combustion engines entrain soot into the ambience. With the multitude of motor vehicles, this soot represents an environment pollution which must be remedied.

There are known devices wherein the soot particles are retained in a porous ceramic body through which the exhaust gas is directed and burned to a large extent due to the high temperature there present. These devices are very efficient. However, the temperature needed for combusting the soot is of the order of 500° C., and such a temperature is reached only after a longer period of operation of the engine.

SUMMARY OF THE INVENTION

The invention is directed to an arrangment which is improved to the effect that the soot separation becomes still more efficient while even reducing the thermal load on the structural parts.

To this end, the invention provides that a body of a porous ceramic material having lengthwise channels (honeycomb structure) and being placed as an insert in the exhaust gas conduit, is closed in a checkerboard manner at at least one end, and that a mesh coated with a layer effective as a catalyst for burning soot is inserted into at least some of the channels.

This catalytically acting mesh produces the effect that the soot is burned already at a considerable lower temperature, of the order of magnitude of about 200° C., so that only a residual combustion takes place within the ceramic body. The mesh may be a fabric of metallic filaments and, in a manner known per se, either coated with the catalytic substance or comprising it as an admixture. Instead of a knitted mesh, a tangled wire mesh may also be used. The staggered checkerboard manner of closing some of the channels at the inlet and/or outlet end produces the effect that, since at least some of the not closed channels accommodate a wire mesh, the exhaust gas carrying the soot particles flows through the channels "filled" with mesh where it is subjected to a first cleaning, and therefrom, by diffusion along the channels through the ceramic walls, into adjacent "not-filled" channels, to escape to the outside. In the course of this diffusion, the remaining soot particles are burned or trapped by the material. The cross-sectional area of each channel is of the order of 30 to 50 mm² and the catalytically effective wire mesh is introduced into the channels under pressure so that it may be compressed at the same time. With this arrangement, it may also be provided to fill all of the channels with mesh, which are open at the inlet end, or all of the channels which are open at the outlet end, considered in respect to the exhaust gas flow direction. Experience has shown that it is advantageous first to strip the exhaust gas from soot by means of the mesh, and only then to clean it in the ceramic body.

In a particularly advantageous embodiment, a checkerboard closure is provided at both the inlet and the outlet end. As described above, these closures may form a part of the ceramic honeycomb body so that the body is closed at its front ends with identical material, for example by filling, or sealing, or even plugging. The closure on the two ends, of course, must be such that the closed areas in the closure pattern at one end correspond to open areas at the other end. This ensures the maximum path for the exhaust gas flow which then cannot escape from the same channel which it has entered and must always diffuse through the walls into an adjacent channel.

In another advantageous embodiment, the closure is designed as a separate part mounted for rotary motion. The advantage thereof is that the flow of the exhaust gas within the body can be adjusted in various ways in advance, before mounting the body in place, by correspondingly positioning the closing part or parts, which may be of importance with regard to the counterpressure of the exhaust gas. That is, if partial streams of the gas can flow through channels which are not "filled" with mesh, and the amount of soot does not prevent it, then the counterpressure is reduced.

According to still another embodiment of the invention, the covers or closing parts may be mounted in the exhaust gas conduit so as to support the ceramic body. The ceramic body, which is sensitive to shocks, is thereby better protected. Also, a resilient mesh ring may be provided between the inlet closure and the ceramic body. Such a ring at the same time acts as an obstacle preventing a portion of the gas from flowing past the ceramic body and thus escaping without being cleaned. In these arrangements, in a manner known per se, the ceramic body may be a catalytically effective honeycomb structure also serving the purpose of cleaning the exhaust gas from carbon monoxide and hydrocarbons. Finally, in a development of the invention, the mesh may be introduced into the channels in the shape of single- or multi-layer tubes.

Accordingly it is an object of the invention to provide an exhaust gas treatment device which includes a porous body provided to reduce the soot content in the exhaust gases of internal combustion engines which has lengthwise extending channels in the body which are closed at at least one end and which includes a mesh of a catalytic material for burning soot accommodated in at least one of the channels.

A further object of the invention is to provide a device for preheating exhaust gases of internal combustion engines which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
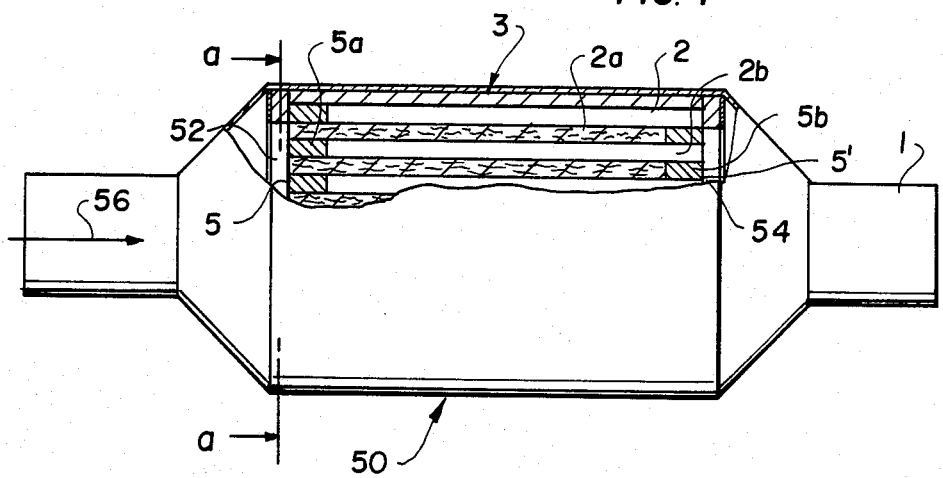
FIG. 1 is a side elevational view partly in section of an exhaust gas treatment device arranged in an exhaust gas conduit of an internal combustion engine and constructed in accordance with the invention.

Referring to the drawings in particular the invention embodied therein comprises an exhaust gas treatment device generally designated 50 which is adapted to be connected into an exhaust line 1 of an internal combustion engine. The exhaust gas treatment device 50 includes a porous body generally designated 3 which, for example, may be cylindrical or rectangular or any suitable shape and which includes a plurality of conduits 2 which extend along the length thereof, for example extend axially. The conduits have first inlet ends 52 and opposite or second outlet ends 54. The construction includes first closure means 5 closing the inlet ends of at least some of the conduits 2 and second closure means 5' closing the outlet end of at least some of the others of the conduits 2. The construction is such that gases flow in the direction of arrow 56 of the exhaust gas conduit 1 and into the opening of the conduits 2 which are opened at their inlets and since at least some of these are closed at the opposite ends, the gases flow through the porous walls of the body 2 into the others of the conduits. At least some of these others are open at their outlet ends so that the gases flow through these conduits and exit through the outlet end 5' into the exhaust line 1. Advantageously, the catalyst mesh is placed in at least some of the conduits which are closed at their inlet ends.

Figure 2:
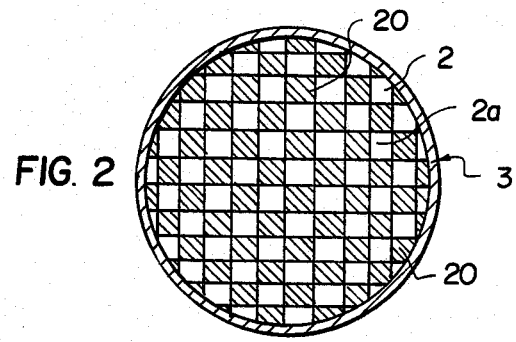
FIG. 2 is a sectional view taken along the line a—a of FIG. 1.

As shown in FIG. 1, an exhaust gas conduit 1 has an insert 3 received therein. Insert 3 is made of a porous ceramic material and provided with channels 2. Channels 2 may have any desired cross section, for example circular or polygonal. In prior art designs, about 16 channels, for example, are provided per square inch. As shown in FIGS. 1 and 2, about one half of the channels are closed at one end. The closures 5a may be designed as plugs or formed by a snugly planar grid. The solid areas 20 of the checkerboard pattern, of course, correspond to the cross-sectional areas of the channels 2, which are circular or rectangular, for example. In the shown embodiment, the channels 2 are square. The pattern of the covered or closed areas is such that every channel 2a is open at the inlet end, while the adjacent channel 2b is closed at its inlet end and open at the outlet end. In the shown example, all channels 2a open at the inlet end are filled with a wire mesh 4, which comprises a knit or tangled mesh of fine metallic wire which is catalytically coated, in order to effect a combustion of the soot particles.

Figure 3:
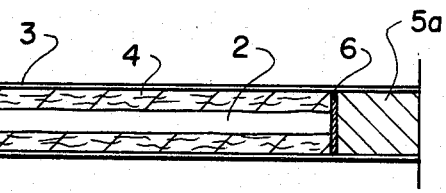
FIG. 3 is an enlarged partial sectional view of one of the conduits of the porous body shown in FIG. 1.

The channels may also be filled with a single- or multi-layer tubular lining, or a stump with an opening therethrough parallel to its channel. This has the advantage of a more uniform contact with the exhaust gas flowing through the respective channel 2. Such a design is shown in FIG. 3. A closure 5a in this example is formed by a plug. Insert 3 which is sensitive to shocks, is supported through resilient mesh rings 6 which at the same time compensate for the unequal thermal expansion of exhaust gas conduit 1 and insert 3.

The inflowing exhaust gas enters channels 2a which are open at the inlet end. Due to mesh 4 accommodated in these channels, a part of the soot particles is burned already at a firing temperature of about 200° C. The efficiency in this phase may already amount to 50%. Since channels 2a are closed at the outlet end, the exhaust gas passes through the porous wall of insert 3 into one of adjacent channels 2b which are closed at the inlet end and open at the outlet end. During this diffusion, a further part of remaining soot particles is combusted. The firing temperature there is about 500° C. and the measured efficiency amounts to 90%. The exhaust gas which has passed through the porous wall into channels 2b then escapes clean into exhaust conduit 1 and to the outside.

It is possible of course, to fill all channels 2 with the mesh. In such a case, the gas is cleaned also in the channels which are open at the outlet end. It has been found, however, that this is needed only exceptionally.

While specific embodiments of the invention have been shown and described in detail to illustrate the application of the principles of the invention, it will be understood that the invention may be embodied otherwise without departing from such principles.

What is claimed is:

1. A device for reducing soot content of exhaust gases of inernal combustion engines, comprising a porous ceramic body adapted to be located in an exhaust gas conduit and having a plurality of lengthwise extending polygonal channels lying side-by-side in a checkerboard pattern each with an inlet and an outlet, means for closing inlets of alternate ones of said channels in a checkerboard pattern and for closing outlets of remaining ones of said channels in a checkerboard pattern, said means for closing the inlets and outlets being arranged so that alternately adjacent channels are closed, and a tubular knitted metal wire fabric comprising a filling of at least one half a cross-sectional area of a channel, acting as a catalyst for burning soot accommodated in all channels of one of said alternate and remaining ones of said channels.

2. A device according to claim 1, wherein all of said alternate channels have open outlets and all of said remaining channels have open inlets, said wire fabric filling at least one-half a cross-sectional area of all of said alternate channels having open outlets.

3. A device according to claim 1, wherein said means for closing includes a separate closure member arranged at each end of said body for supporting said body therebetween and being spaced from respective inlets and outlets of said channels, and a resilient mesh ring provided between said ceramic body and each of said closure members, each ring extending around said checkerboard pattern of one of said inlets and outlets.

4. A device according to claim 3, wherein said wire fabric in all channels of one of said alternate and remaining ones of said channels has the shape of at least one layer of lining which has an opening through the center thereof.

5. A device according to claim 1, wherein said wire fabric is catalytically coated for effecting burning of soot.

6. A device according to claim 5, wherein all of said alternate channels have open outlets and all of said remaining channels have open inlets, said wire fabric filling at least one-half a cross-sectional area of all of said alternate channels having open outlets.

7. A device according to claim 6, wherein the cross-sectional area of each channel is from 30 to 50 mm$^2$.

8. A device for reducing soot content of exhaust gases of internal combustion engines, comprising a porous ceramic body adapted to be located in an exhaust gas conduit and having a plurality of length-wise extending rectangular channels lying side-by-side in a checker board pattern each with an inlet and an outlet, means for closing all inlets of alternate ones of said channels in a checkboard pattern and for closing all outlets of remaining ones of said channels in a checkboard pattern, said means for closing comprising plugs in said inlets and outlets respectively, said plugs being arranged so that alternately adjacent channels are closed, and a tubular knitted metal wire fabric filling at least one half a cross-sectional area of a channel acting as a catalyst for burning soot accommodated in all channels of one of said alternate and remaining ones of said channels, said means for closing including a separate closure member arranged at each end of said body for supporting said body there between and being spaced from respective inlets and outlets of said channels, a resilient mesh ring provided between said ceramic body and each of said closure members, each ring extending around said checkerboard pattern of one of said inlets and outlets.

* * * * *